United States Patent [19]

Mathur et al.

[11] Patent Number: 5,440,079
[45] Date of Patent: Aug. 8, 1995

[54] OBJECT-BACKGROUND DISCRIMINATION USING ANALOG VLSI CIRCUIT

[75] Inventors: Bimal P. Mathur, Thousand Oaks; Christof Koch, Pasadena, both of Calif.

[73] Assignee: Rockwell International Corporation, Seal Beach, Calif.

[21] Appl. No.: 80,905

[22] Filed: Jun. 21, 1993

[51] Int. Cl.$^6$ .................... G08C 21/00; G06K 9/52
[52] U.S. Cl. ............................................. 178/18
[58] Field of Search ............... 178/18; 382/22, 14, 382/25, 27, 28, 35; 348/25; 395/22, 24

[56] References Cited

U.S. PATENT DOCUMENTS

| | | | |
|---|---|---|---|
| 3,088,096 | 4/1963 | Steinbuch | 382/28 |
| 5,218,440 | 6/1993 | Mathur | 358/213.27 |
| 5,381,054 | 1/1995 | Standley | 327/82 |

OTHER PUBLICATIONS

J. Hutchinson, C. Koch, J. Luo, and C. Mead, "Computing Motion using Analog and Binary Resistive Networks," *Computer*, vol. 21, No. 3, pp. 52–63, Mar. 1988.
M. Maher, S. DeWeerth, M. Mahoward, and C. Mead, "Implementing Neural Architectures using Analog VLSI Circuits," *IEEE Trans. on Circuits and Systems*, vol. 36, No. 5, pp. 643–652, May 1989.
J. Harris, C. Koch, J. Luo, "A Two-Dimensional Analog VLSI Circuit for Detecting Discontinuities in Early Vision," *Science*, vol. 248, pp. 1209–1211, Jun. 8, 1990.

*Primary Examiner*—Stephen Chin
*Assistant Examiner*—Kevin Kim
*Attorney, Agent, or Firm*—John C. McFarren

[57] ABSTRACT

An analog VLSI circuit having a network of resistive elements and switches is provided for discriminating between an object and the background in a sensor image of a scene. A sensor system captures two-dimensional visual images and identifies edges of objects. The output of the imaging system is mapped onto the switched resistive grid. The presence of object edges causes switches to open at corresponding grid points in the resistive network. The periphery of the grid is connected to a first voltage, while a central point of the grid is connected to a second voltage. An edge map contour of open switches surrounding the central point causes the voltage at every point within the contour to rise to the second voltage, while every grid point outside the contour settles to the first voltage. Thus, the object enclosed by the edge map contour is labeled or tagged with the second voltage and the surrounding background is characterized by the first voltage. The object-background segregation occurs in parallel, independent of the complexity or arc length of the edge map contour. Nonlinear resistive elements, such as saturating resistive circuits, may be used to limit current flow through gaps or breaks in the contour. This prevents full voltage equalization and allows object-background discrimination for discontinuous contours based on a selected voltage threshold.

12 Claims, 3 Drawing Sheets

OBJECT-BACKGROUND DISCRIMINATION USING ANALOG VLSI CIRCUIT

The United States Government has rights in this invention under contract number N00014-91-J-1174 awarded by the Department of the Navy.

TECHNICAL FIELD

The present invention relates to image processing systems and, in particular, to an analog application specific integrated circuit for identifying and tagging an object as distinguished from the background in a sensor image.

BACKGROUND OF THE INVENTION

Machine vision systems attempt to identify physical properties of a three-dimensional scene from two-dimensional intensity data provided by image sensors. Pixel-based algorithms, in which a scalar or vector is returned at each picture element (as in edge detection and optical flow algorithms, for example) produce an output at every grid point. Analog CMOS VLSI circuits, which often include on-chip photoreceptor arrays, have been developed for implementing such pixel-based algorithms. However, there has been little attention paid to developing special-purpose, application specific integrated circuits that advance the art beyond the early vision algorithms.

An area or region distinguishable from the background of a scene by visual features, such as brightness, depth, texture, or motion, for example, is easily identified by a human observer as an object separate from the background. In a machine vision system, a functionally related routine is required for the task of determining whether a particular point (pixel) is inside or outside one or more visual contours in a detected image. Thus, there is a need for a method and apparatus for distinguishing between object and background in the two-dimensional intensity data provided by an image sensor of a machine vision system.

SUMMARY OF THE INVENTION

The present invention comprises an analog, application specific VLSI circuit having a network of resistive elements and switches for discriminating between an object and the background in a sensor image of a scene. The invention is used in conjunction with a sensor system that captures two-dimensional visual images and identifies edges of objects. Such a system might comprise, for example, an imaging device with on-chip photoreceptors, microprocessor, and output multiplexer. The output of the imaging device is mapped into the resistive network of the present invention. The presence of an edge in the mapped image causes switches to open at each corresponding grid point in the resistive network, thereby isolating points inside an edge contour (i.e., the object) from points outside the contour.

The periphery of the network is connected to a voltage source Vgnd. At least one central point of the resistive network is connected to a second voltage, Vfig, and the remaining grid points (or nodes) of the network are allowed to float. If the edge map, which is represented as a contour of open switches, completely surrounds the central point, the voltage at every grid point within the edge map contour will rise to Vfig, while the voltage at every grid point outside the contour will settle to the voltage Vgnd. Thus, the object (or "figure") enclosed by the edge map contour will be labeled or tagged with one voltage level and the surrounding background (or "ground") will be characterized by a different voltage level. Actual images, however, typically comprise contour segments separated by breaks or gaps of one or more pixels. Such gaps allow current to flow out of the grid area generally surrounded by the contour, thus reducing the voltage level contrast between the inside and outside of the contour. The present invention uses nonlinear resistive elements to limit the current flow through gaps in the contour. This prevents full voltage equalization and allows decision making, by voltage threshold selection, for object-background discrimination in the presence of broken contours. The object-background segregation occurs in parallel, independent of the complexity or arc length of the edge map contour.

A principal object of the invention is to label, tag, and/or lock onto an object identified in a two-dimensional sensor image of a scene. A feature of the invention is an analog, application specific VLSI circuit having a network of resistive elements and switches for discriminating between an object and the background in a sensor image of a scene. An advantage of the invention is an analog circuit chip in which a single voltage value encodes an ensemble of pixels to distinguish an object from the background in a sensor image.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

Figure 1:
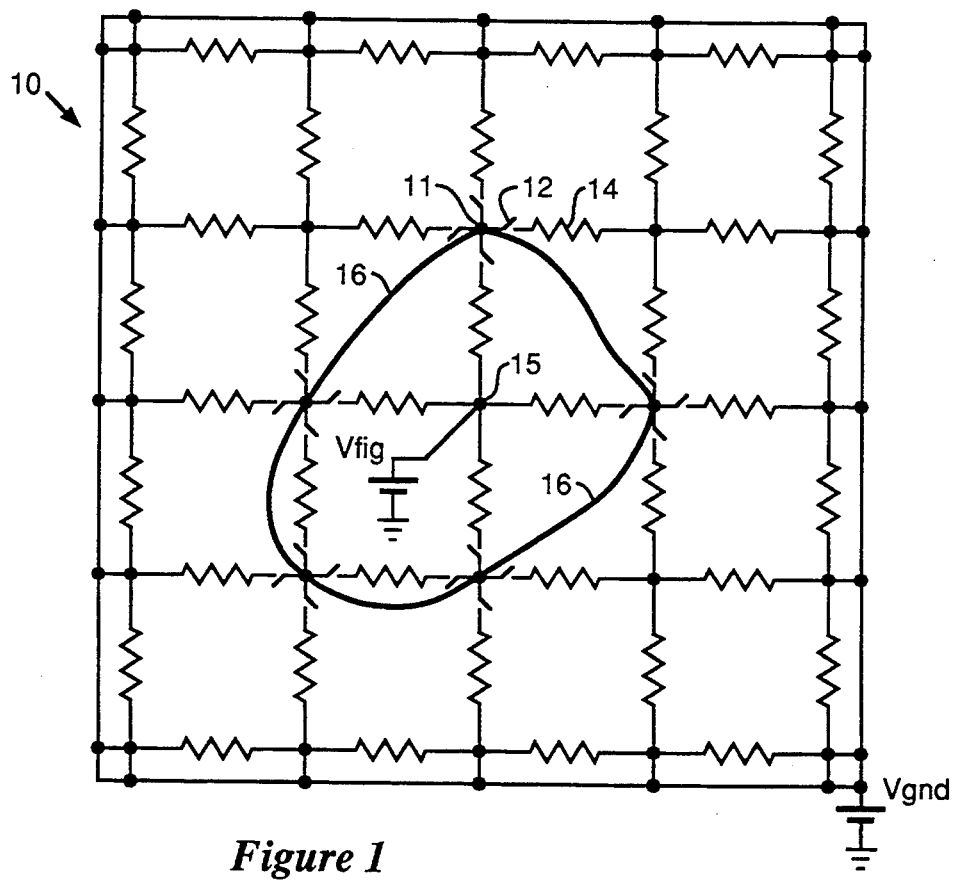
FIG. 1 is a schematic diagram of a resistive network of the present invention.

Early vision comprises processes that recover physical properties of a visible three-dimensional surface, such as texture or distance from the observer, from two-dimensional intensity data. These processes are often pixel-based in that a scalar or vector is returned at each picture element, as in edge detection and optical flow sensors, for example. The previous development of subthreshold, analog CMOS (Complementary Metal Oxide Semiconductor) VLSI circuits for various sensory tasks (see, for example, Mead, C., *Analog VLSI and Neural Systems*, Addison-Wesley, Reading, Mass., 1989), has enabled the use of resistive networks (instead of powerful general purpose digital computers) for processing sensor images. In the present invention, an analog, application specific VLSI circuit comprising an array of resistive elements and switches is used to output a single variable associated with a contour or an entire object as distinguished from the background of a sensor image.

The present invention is designed for use with a sensor system that captures a two-dimensional image of a scene and determines the position of edges of objects in the image. Such a sensor system may comprise, for example, an analog zero-crossing circuit with on-chip photoreceptors, as is known in the prior art. The edge map output of the sensor system is scanned into the analog VLSI circuit of the present invention, which includes a network 10 of resistive elements and switches as illustrated schematically in FIG. 1.

Network 10 comprises an array of grid points or nodes, such as node 11, each of which is separated from adjoining nodes by a plurality of switches, such as switch 12. In a rectangular grid, such as network 10, for example, each node has four switches connecting it to the grid. Other grid patterns, such as triangular, may require more or fewer node connections. A plurality of resistive elements, such as resistive element 14, connect each node and its associated switches to adjoining nodes. The periphery of network 10 is connected to a voltage source (or ground) Vgnd and a central node 15 is connected to a voltage source Vfig.

A sensor image having an edge map contour 16 of an object is scanned into network 10. In the illustrated embodiment, the nodes of network 10 correspond to pixels in the sensor image. The presence of an edge of contour 16 at a node, such as node 11, causes the switches at that node of network 10 to open (as illustrated by open switch 12). The switches for all nodes of network 10 not corresponding to an edge of contour 16 remain closed, as shown in FIG. 1. Closed edge contour 16 in the sensor image thus corresponds to a series of open node switches that isolate a region of the resistive grid of network 10. In an alternative embodiment having additional select and logic circuits, contour edges can be mapped onto individual resistive connections between neighboring nodes (i.e., between pixels) to provide greater spatial resolution. For illustrative purposes, contour 16, which represents the object or figure in the sensor image to be distinguished from the background, is assumed to encompass a central node 15 of network 10.

As explained above, voltage source Vfig is connected to central node 15, voltage source Vgnd is connected to the periphery of network 10, and the remaining nodes of the grid are allowed to float. Because central node 15 is isolated from the periphery of network 10 by the open switches at all nodes around contour 16, the voltage at all points inside contour 16 rises to Vfig (assuming negligible current leakage) while the voltage at all points outside contour 16 settles to Vgnd. Thus, the object or figure defined by edge contour 16 is labeled or tagged by one voltage (Vfig) and the background (or ground) is characterized by another voltage (Vgnd). Assuming negligible parasitic capacitance in network 10, object-background discrimination occurs in parallel, independent of the complexity or arc length of contour 16.

Figure 2:
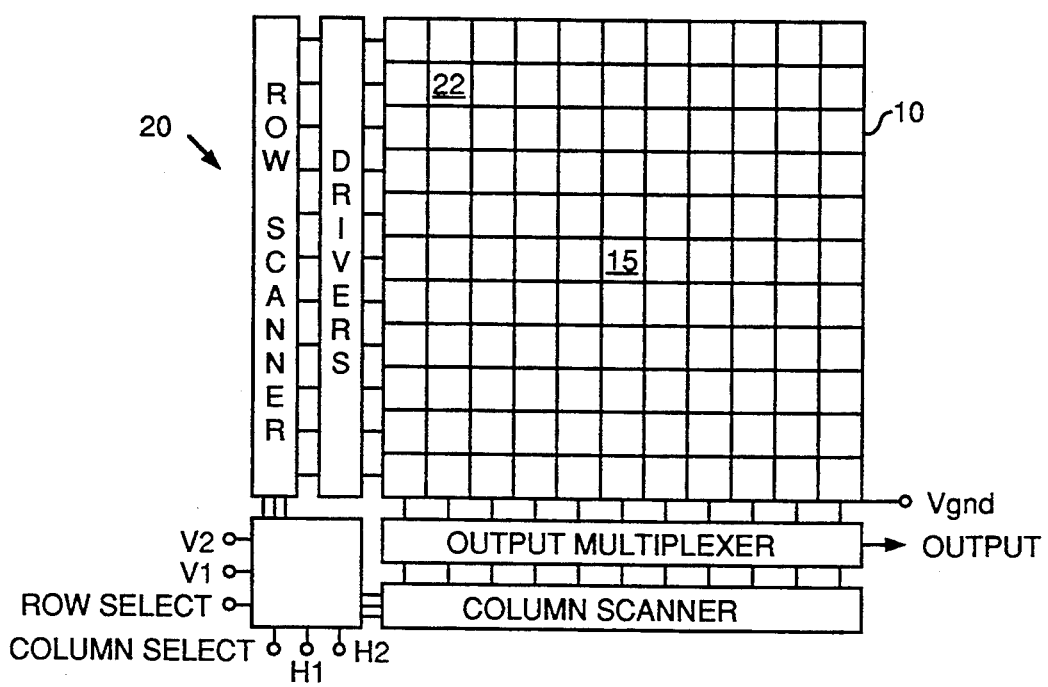
FIG. 2 is a schematic diagram of an analog VLSI circuit of the present invention incorporating the resistive network of FIG. 1.

FIG. 2 is a schematic layout diagram of analog VLSI circuit 20 of the present invention. Circuit 20 comprises network 10, including central node 15, as described above, along with a scanning frame comprising row and column scanners for inputting sensor image data and a multiplexer for outputting processed data. The scanning frame of circuit 20 interfaces with a sensor system (not shown) for mapping a sensor image into network 10. Circuit 20 comprises a plurality of processing elements in a grid, such as processing element 22 at row 2, column 2. Each processing element of circuit 20 corresponds to a node of network 10 (as illustrated in FIG. 1) along with its associated resistive elements and switches.

In operation, circuit 20 may be connected directly to other analog and digital circuitry (not shown) for data routing and overall control of image processing. The input to circuit 20 generally includes both vertical and horizontal clock states (V1, V2, H1, H2) and row and column select bits. Each scanner stage of circuit 20 sends out binary signals through drivers to selection lines which access the rows and columns of processing elements.

Figure 3:
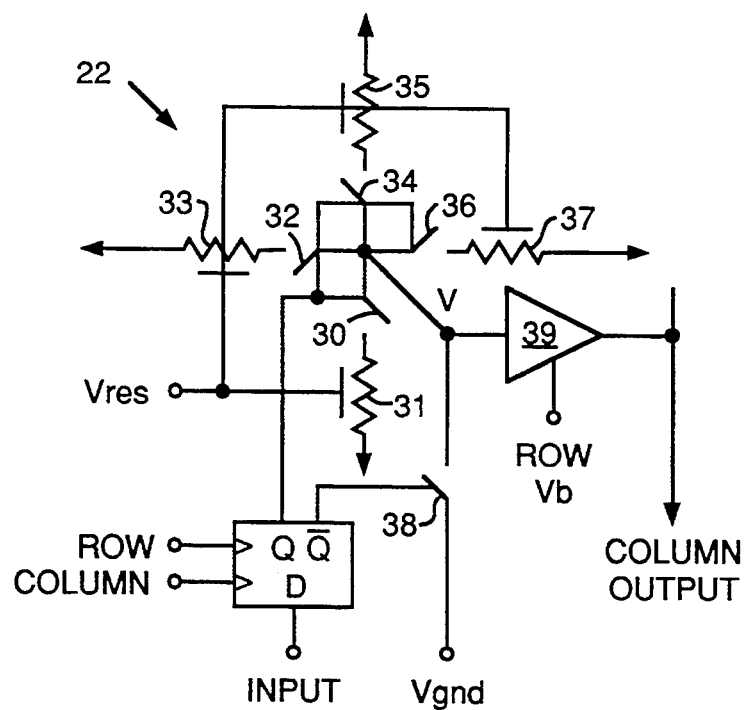
FIG. 3 is a schematic circuit diagram of one of a plurality of processing elements making up the VLSI circuit of FIG. 2.

Processing element 22 is illustrated in greater detail in the schematic circuit diagram of FIG. 3. Processing element 22 includes node switches 30, 32, 34, and 36, and corresponding resistive elements 31, 33, 35, and 37 that connect processing element 22 to adjoining elements in network 10. Switches 30, 32, 34, and 36 operate under the status of the row and column select bits. If image contour 16 crosses a node, the four switches (30, 32, 34, and 36) of the processing element corresponding to that node are enabled by the select bit and opened by input data signal Q. A fifth switch 38 is controlled by the complementary input signal $\overline{Q}$, which connects the node to Vgnd when the other four switches (30, 32, 34, and 36) are opened. If contour 16 does not appear at the node, the four switches (30, 32, 34, and 36) surrounding the node are closed and the fifth switch 38 is opened, thereby allowing node voltage V to float. An analog buffer, comprising transconductance amplifier 39, is used to output node voltage V. When a row select signal Vb appears on the row select line connected to transconductance amp 39, node voltage V is duplicated on the column output line.

Figure 4:
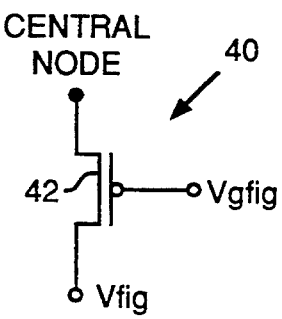
FIG. 4 is a schematic circuit diagram of a central node biasing element for the VLSI circuit of FIG. 2.

FIG. 4 is a schematic diagram of a current injection circuit 40 for a centrally located processing element (i.e., node 15) of network 10. Circuit 40 comprises a transistor 42 that is large enough (in terms of channel width) to provide sufficient current injection for network 10. Voltage Vfig is applied to the central processing element through transistor 42. Adjustable bias Vgfig controls the conductance G of the current injection to network 10. The configuration of circuit 40 thus allows adjustment of the injected current, which is useful for the characterization of VLSI circuit 20.

Contours of real images frequently comprise segments separated by breaks or gaps of one or more pixels. In this case, injected current from source Vfig can flow through the breaks or gaps, thus causing the voltage level inside contour 16 to "smear" into the voltage level outside. The present invention uses nonlinear resistive elements, such as saturating resistive circuits, for example, to limit current flow through gaps in contour 16. An example of a saturating resistive circuit is illustrated in FIG. 5.

Figure 5:
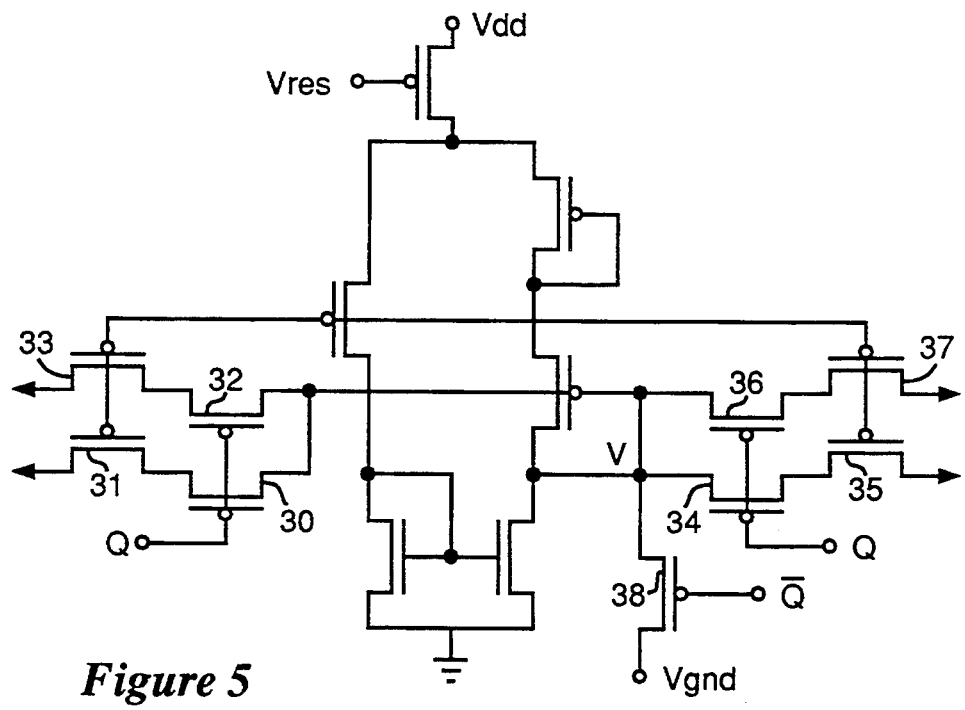
FIG. 5 is a schematic circuit diagram of one embodiment of nonlinear resistive elements and switches making up the processing element of FIG. 3.

FIG. 5 is a schematic circuit diagram showing the switches and resistive elements of processing element 22 in greater detail. Switches 30, 32, 34, and 36 comprise transistors controlled by input signal Q for switchably connecting processing element 22 to neighboring nodes. Switch 38 comprises a transistor controlled by complementary signal $\overline{Q}$. The nonlinear resistive elements are implemented by pass transistors 31, 33, 35, and 37, which are biased by the shared bias circuitry shown in FIG. 5.

Figure 6:
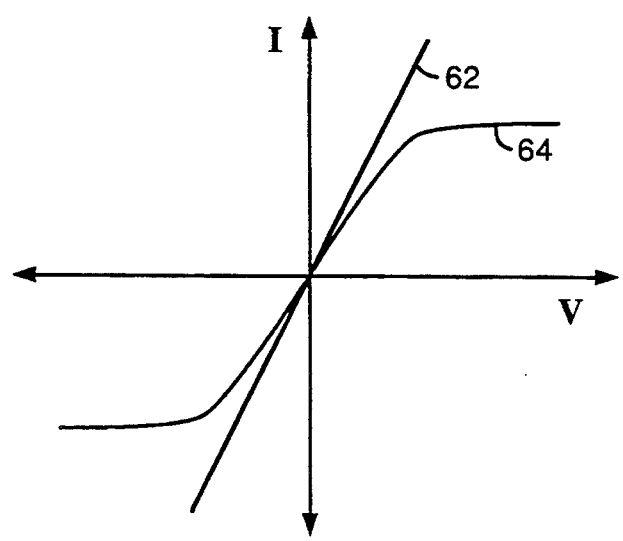
FIG. 6 is a graph illustrating the voltage-current characteristics of a linear resistance compared to an example of a nonlinear resistive element.

FIG. 6 compares the I-V characteristics of linear resistive elements, illustrated by line 62, with nonlinear resistive elements (such as saturating resistive elements, for example) illustrated by curve 64. The I-V relationship of the saturating resistive elements of FIG. 5, illustrated by curve 64, is linear for a small voltage range around the origin. For a large voltage difference across the resistive circuit, however, the current saturates. At locations in network 10 where contour 16 is broken, the voltage gradient is large and the nonlinear resistive elements limit the current flow, thus limiting the smoothing of the voltage profile across contour 16. The resistance values of the circuit of FIG. 5 can be varied over five orders of magnitude, from about 100 KΩ to over 10 GΩ, to facilitate adaptation of the circuit to specific applications.

In the operation of circuit 20, if contour 16 is unbroken, as illustrated in FIG. 1, the voltage inside contour 16 rises to Vfig, distinguishing the contour-bounded object from the background voltage of Vgnd. The "inside" and "outside" of contour 16 can be strictly defined, however, only for a completely closed contour. For a small break along an otherwise continuous contour, human perception tends to fill in the gap to complete the contour. Likewise, if a small gap appears in contour 16, it is partially "sealed" off by action of the nonlinear resistive elements of VLSI circuit 20 that limit the current flowing through the gap, thereby inhibiting voltage equalization across the gap. As the break in contour 16 becomes larger, however, the voltage gradient between the "inside" and "outside" of contour 16 becomes smaller. The conductance of the resistive circuit of FIG. 5 can be lowered to increase the voltage gradient, but then circuit 20 becomes less able to discriminate between large and small gaps in contour 16. By adjusting Vfig, Vgnd, and the conductance of the resistive elements, VLSI circuit 20 can simulate human perception by distinguishing a single object when there are only small gaps in contour 16 and identifying separate or no objects when contour 16 becomes broken or discontinuous with large gaps.

As described above, analog VLSI circuit 20 is able to distinguish between objects and background even when incomplete or broken edge boundaries are present. The contour completion capability is provided by the I-V characteristics of the nonlinear resistive elements rather than by complicated, non-local, machine vision algorithms. A single analog VLSI circuit 20 can therefore replace a considerably more complex system of digital algorithms. Unlike prior art vision chips, VLSI circuit 20 associates a single variable (i.e., the Vfig voltage level) with an entire object rather than with an individual pixel. Uses for circuit 20 include situations in which rapid identification and discrimination of an object from a cluttered image background is essential. The object in the image, once separated from the background, can then be further processed for identification or other requirements.

Limitations of VLSI circuit 20 as described above include the difficulty in discriminating objects having more than small gaps in the contour and the constraint that the object must encompass a central node 15 of network 10. Better contour "sealing" may be accomplished by nonlinear resistive elements having I-V characteristics in which the current drops to a low value when a large voltage difference is applied. In addition, spatial resolution may be increased by mapping the edges of contour 16 onto resistive elements connecting adjacent nodes rather than onto entire nodes as illustrated in the Figures. Furthermore, instead of a single, centrally located current injection node 15, multiple, selectable current injection nodes throughout network 10 would enable the discrimination and labeling (or tagging) of any object in an image mapped into VLSI circuit 20.

Although the present invention has been described with respect to specific embodiments and enhancements thereof, various changes and modifications can be carried out by those skilled in the art without departing from the scope of the invention. Therefore, it is intended that the present invention encompass such changes and modifications as fall within the scope of the appended claims.

We claim:

1. An analog circuit, comprising:
   a network having a plurality of electrical nodes;
   a plurality of switchable means, each of said switchable means for connecting one of said nodes to an adjoining node;
   means for biasing a periphery of said network to a first voltage;
   means for mapping a sensor image into said network, said image including background and an object having an edge contour;
   means for opening said switches in said network at positions corresponding to said edge contour; and
   a current injection circuit for biasing nodes of said network within said edge contour to a second voltage different from said first voltage, thereby discriminating said object from said background.

2. The analog circuit of claim 1, further comprising means for selecting and adjusting said current injection circuit.

3. The analog circuit of claim 2, wherein said current injection circuit comprises a current injection transistor.

4. The analog circuit of claim 3, wherein said selecting and adjusting means comprises an adjustable bias signal provided to said current injection transistor.

5. An analog circuit for processing sensor images, comprising:
   a network comprising a plurality of electrical nodes;
   means for connecting each of said nodes to at least one adjoining node in said network;
   each of said connecting means comprising a switch and a resistive element in electrical series;
   means for biasing a periphery of said network to a first voltage;
   means for mapping a sensor image into said network, said image including an object having an edge contour distinguishable from a background;
   means for opening said switches in said network at positions corresponding to said edge contour of said mapped sensor image;
   at least one current injection circuit for biasing nodes of said network within said edge contour of said mapped image to a second voltage different from said first voltage, thereby electrically tagging said object as having a voltage different from said background.

6. The analog circuit of claim 5, further comprising means for selecting and adjusting said at least one current injection circuit.

7. The analog circuit of claim 6, wherein said at least one current injection circuit comprises a current injection transistor.

8. The analog circuit of claim 7, wherein said selecting and adjusting means comprises an adjustable bias signal provided to said current injection transistor.

9. A method of processing sensor images, comprising the steps of:
providing a plurality of electrical nodes in a network;
providing a plurality of connecting means each comprising a switch and a resistive element in electrical series;
connecting each of said nodes to at least one adjoining node in said network with one of said connecting means;
biasing a periphery of said network to a first voltage;
mapping a sensor image into said network, said image including an object having an edge contour distinguishable from a background;
opening said switches in said network at positions corresponding to said edge contour of said mapped sensor image;
providing at least one current injection circuit for biasing nodes of said network within said edge contour of said mapped image to a second voltage different from said first voltage, thereby electrically tagging said object as having a voltage different from said background.

10. The method of claim 9, further comprising the step of selecting and adjusting said at least one current injection circuit.

11. The method of claim 10, wherein the step of providing said at least one current injection circuit comprises providing a current injection transistor.

12. The method of claim 11, wherein the step of selecting and adjusting comprises providing an adjustable bias signal to said current injection transistor.

* * * * *